US011723305B2

(12) United States Patent
Coleman

(10) Patent No.: US 11,723,305 B2
(45) Date of Patent: Aug. 15, 2023

(54) CALIBRATION OF POWER EQUIPMENT UTILIZING OBJECTIVE DATA OF EQUIPMENT OUTPUT

(71) Applicant: MTD Products Inc, Valley City, OH (US)

(72) Inventor: John Coleman, Sheffield (GB)

(73) Assignee: MTD PRODUCTS INC, Valley City, OH (US)

( * ) Notice: Subject to any disclaimer, the term of this patent is extended or adjusted under 35 U.S.C. 154(b) by 276 days.

(21) Appl. No.: 16/885,355

(22) Filed: May 28, 2020

(65) Prior Publication Data
US 2020/0375096 A1 Dec. 3, 2020

Related U.S. Application Data

(60) Provisional application No. 62/853,328, filed on May 28, 2019.

(51) Int. Cl.
*A01D 34/00* (2006.01)
*A01D 34/835* (2006.01)
*G05D 1/00* (2006.01)
*G06V 20/10* (2022.01)
*A01D 101/00* (2006.01)

(52) U.S. Cl.
CPC ......... *A01D 34/008* (2013.01); *A01D 34/835* (2013.01); *G05D 1/0022* (2013.01); *G06V 20/188* (2022.01); *A01D 2101/00* (2013.01); *G05D 2201/0208* (2013.01)

(58) Field of Classification Search
CPC ................ A01D 34/008; A01D 34/835; A01D 2101/00; G05D 1/0022; G05D 2201/0208; G06V 20/188
See application file for complete search history.

(56) References Cited

U.S. PATENT DOCUMENTS

| 3,907,370 A | 9/1975 | Bard |
| 11,280,872 B1 * | 3/2022 | Godil ..................... G01S 3/782 |

(Continued)

FOREIGN PATENT DOCUMENTS

| AT | 42352 | 5/1910 |
| EP | 1731010 | 12/2006 |

(Continued)

OTHER PUBLICATIONS https://www.youtube.com/watch?v=FI6heSoLuB8 (Year: 2011).*

(Continued)

*Primary Examiner* — Jeff A Burke
*Assistant Examiner* — Sihar A Karwan
(74) *Attorney, Agent, or Firm* — Wegman Hessler Valore

(57) ABSTRACT

Providing objective analysis of performance results of power equipment devices are detailed throughout this disclosure. Image data of vegetation cut by a power equipment device can be captured and uploaded to a server for analysis. Data pertinent to the performance results, such as environment conditions, mechanical parameter settings, type of vegetation or turf, and so forth can be submitted with the image data in some disclosed aspects. Analysis results, optionally in conjunction with adjustment data for adjusting mechanical settings of the power equipment can be provided in response to the image data.

20 Claims, 9 Drawing Sheets

(56) References Cited

U.S. PATENT DOCUMENTS

| | | | |
|---|---|---|---|
| 2002/0173877 A1 | 11/2002 | Zweig | |
| 2004/0032974 A1* | 2/2004 | Kriesel | A01K 29/00 |
| | | | 382/110 |
| 2012/0265391 A1 | 10/2012 | Letsky | |
| 2019/0313576 A1* | 10/2019 | Haneda | A01G 25/16 |

FOREIGN PATENT DOCUMENTS

| | | |
|---|---|---|
| EP | 2279880 | 2/2011 |
| EP | 2987646 | 2/2016 |
| WO | 20070109624 | 9/2007 |
| WO | 2016098040 | 6/2016 |
| WO | 2018123631 | 7/2018 |
| WO | 2019108505 | 6/2019 |

OTHER PUBLICATIONS

International Search Report and Written Opinion for International Application No. PCT/US2020/034777 dated Aug. 19, 2020 (12 pages long).

International Preliminary Report on Patentability for International Patent Application No. PCT/US2020/034777 dated Dec. 9, 2021 (10 pages long).

* cited by examiner

CALIBRATION OF POWER EQUIPMENT UTILIZING OBJECTIVE DATA OF EQUIPMENT OUTPUT

CROSS REFERENCE TO RELATED PATENT APPLICATION

The present application for patent claims the benefit of priority of U.S. Provisional Patent Application No. 62/853,328 entitled Calibration of Power Equipment Utilizing Objective Data of Equipment Output, and filed May 28, 2019, the disclosure of which is hereby incorporated by reference herein in its entirety and for all purposes.

FIELD OF DISCLOSURE

The disclosed subject matter pertains to apparatuses and methods for calibrating power equipment, for instance, generating adjustment data for power equipment utilizing objective data of equipment output.

BACKGROUND

Manufacturers of power equipment for outdoor maintenance applications offer many types of machines for general maintenance and mowing applications. Generally, these machines can have a variety of forms depending on application, from general urban or suburban lawn maintenance, rural farm and field maintenance, to specialty applications. Even specialty applications can vary significantly, from sporting events requiring moderately precise turf, such as soccer fields or baseball outfields, to events requiring very high-precision surfaces such as golf course greens, tennis courts and the like.

Professional turf managers spend significant time developing familiarity with the operating capabilities of the power equipment used to manage turf, particularly for specialty applications. Capabilities of these machines enable high quality turf maintenance, but can be very complex to understand and operate in a manner that consistently achieves high quality results. Further complicating matters is the effect of dynamic environmental conditions and weather. Different climates, seasons and weather can add further variance to the performance of outdoor power equipment. Significant experience is therefore generally required to successfully maintain high precision turf for multiple applications, in various climates and at differing times of the year.

BRIEF SUMMARY

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

One or more embodiments of this disclosure provide for calibration of power equipment utilizing objective data of results of the equipment (e.g., performance results). In some embodiments, an outdoor power equipment can be applied to suitable vegetation to which the outdoor power equipment is adapted to manage. An image of the vegetation following application of the power equipment can be captured and image data representing the captured image is generated. The image data is analyzed and a quality determination is made for the results of the equipment from the objective data.

In various embodiments, analysis results can include quality-of-cut statistics from image data of cut grass projected within a display field of a prism gauge, as one example. Multiple quality-of-cut determinations can be stored over time and statistical analysis can provide changes in quality-of-cut as a function of various parameters, such as time, environmental condition, type(s) of vegetation, environmental condition(s), or the like. The analytical data can be made available to user devices, allowing users to obtain and utilize the results of the statistical analysis.

In further embodiments, analysis of objective results data can be utilized to generate adjustment data for adjusting a mechanical setting(s) of an outdoor power equipment. In some embodiments, an iterative process is provided to implement progressive calibration of the outdoor power equipment based on successive objective results data, leveraging prior mechanical setting adjustments for subsequent objective data analysis (e.g., quality-of-cut statistics generated from captured image data). In alternative or additional embodiments, existing mechanical setting parameters of the outdoor power equipment can be submitted in conjunction with the objective data for facilitating the quality-of-cut analysis, or in generating the adjustment data for adjusting the mechanical setting(s). In still further embodiments, data pertinent to vegetation, environmental condition data affecting the vegetation, or the like can be submitted with the objective data to facilitate the quality-of-cut analysis or in generating the adjustment data. In still other embodiments, suitable combinations of the foregoing are within the scope of the present disclosure.

In an embodiment, the subject disclosure provides a method of calibrating a machine for mowing vegetation. The method can comprise capturing an image of vegetation within a display field of a prism gauge, the prism gauge configured to optically impose a measurement scale adjacent the image of the vegetation within the display field. Further, the method can comprise establishing a wireless communication link with a remote server device and transmitting image data indicative of the captured image to the remote server device. In additional embodiments, the method can comprise receiving, in response to the transmitting image data, quality data indicative of a quality of cut measurement for the image of the vegetation. Still further, the method can comprise generating output data representing the quality of cut measurement for display of the quality of cut measurement on a graphical display unit of an electronic device.

In a further embodiment(s), the disclosure provides a mobile device adapted to facilitate quality analysis of a power equipment. The mobile device can comprise a processor for executing instructions to perform operations of the mobile device and a memory for maintaining the instructions executed by the processor. Further, the operations can comprise acquiring, by way of a camera module of the mobile device, image data of vegetation, the vegetation having been trimmed by the power equipment. In addition, the operations can comprise at least one of: acquiring, by the processor, settings data pertaining to a current setting of a mechanical parameter of the power equipment or acquiring, by the processor, environment data pertaining to the vegetation or a climate affecting the vegetation. In addition to the above, the operations can comprise forming, utilizing a wireless communication interface of the mobile device, a communication link with a server device remotely located from the mobile device and transmitting, utilizing the wireless communication interface, the image data and the settings data or the environment data to the server device. Moreover, the operations can comprise receiving, utilizing the wireless communication interface, a quality-of-cut determination for the image data of the vegetation in response to transmitting the image data and the settings data or the environment data and outputting, at a graphical display of the mobile device, data indicative of the quality-of-cut determination.

In alternative or additional embodiments of the present disclosure, there is provided a method of generating a quality-of-cut determination for a power equipment. The method can comprise acquiring data indicative of an environmental condition affecting vegetation. Further, the method can comprise capturing image data of the vegetation cut by the power equipment and transmitting the image data and the data indicative of the environment condition to a remote device. Further, the method can comprise receiving response data indicative of a quality-of-cut analysis result for the vegetation cut by the power equipment. In some embodiments, the method can also comprise generating display data for graphically displaying the quality-of-cut analysis result on a graphical display of a mobile device.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

Figure 1:
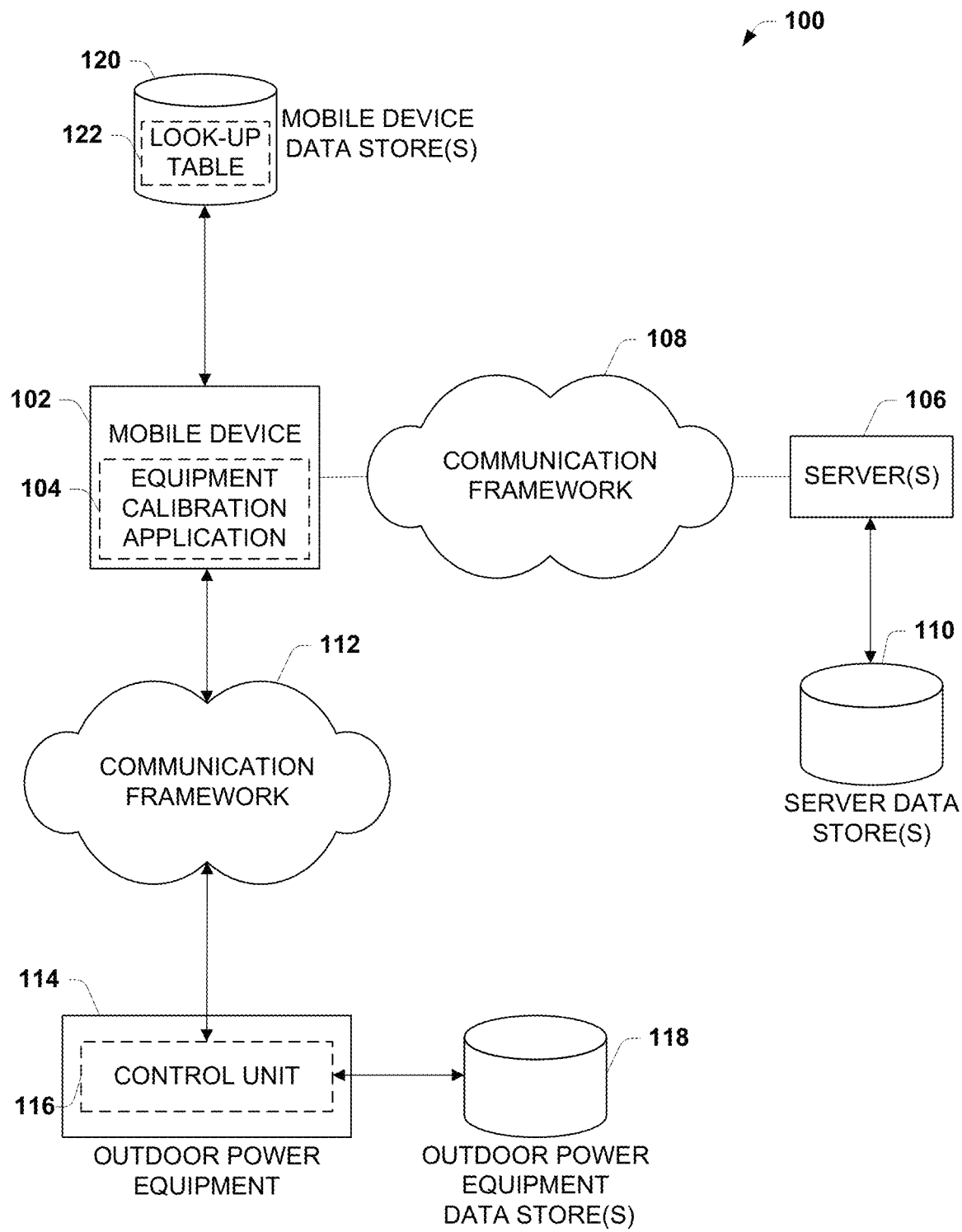
FIG. 1 depicts a block diagram of an example system for generating an objective quality-of-cut analysis for power equipment, in disclosed embodiments.

It should be noted that the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments, except where clear from context that same reference numbers refer to disparate features. Accordingly, the drawings and description are to be regarded as illustrative in nature and not as restrictive.

While embodiments of the disclosure pertaining to equipment calibration and improved quality of cut for power equipment machines are described herein, it should be understood that the equipment calibration applications, devices and methods are not so limited and modifications may be made without departing from the scope of the present disclosure. The scope of the systems, methods, mobile devices and mobile applications for calibrating outdoor power equipment are defined by the appended claims, and all devices, processes, and methods that come within the meaning of the claims, either literally or by equivalence, are intended to be embraced therein.

DETAILED DESCRIPTION

The following terms are used throughout the description, the definitions of which are provided herein to assist in understanding various aspects of the subject disclosure.

As used in this application, the terms "outdoor power equipment", "outdoor power equipment machine", "power equipment", "maintenance machine" and "power equipment machine" are used interchangeably and are intended to refer to any of robotic, ride-on, walk-behind, sulky equipped, autonomous, remote control, or multi-function variants of any of the following: powered carts and wheel barrows, lawn mowers, lawn and garden tractors, lawn trimmers, lawn edgers, lawn and leaf blowers or sweepers, hedge trimmers, pruners, loppers, chainsaws, rakes, pole saws, tillers, cultivators, aerators, log splitters, post hole diggers, trenchers, stump grinders, snow throwers (or any other snow or ice cleaning or clearing implements), lawn, wood and leaf shredders and chippers, lawn and/or leaf vacuums, pressure washers, lawn equipment, garden equipment, driveway sprayers and spreaders, and sports field marking equipment.

As used in this application, the term "image" or "photographic image" is intended to refer to any of a visual image, or visual representation of data, an analog image, a digital image, a video image, a still-frame image, or a data set such as a diagram or chart used to represent information or data.

FIG. 1 illustrates a block diagram of an example computing environment 100 operable in conjunction with various aspects of the present disclosure. Computing environment 100 can comprise one or more mobile devices 102 communicatively coupled with an outdoor server device 106 by way of a communication framework 108. The mobile device(s) 102 can include devices adapted to operate in response to command or data input at a user interface, or can be adapted to operate in response to command or data input from another computing device, housed together with mobile device(s) 102 or located remotely from mobile device(s) 102 and connected by a communication or operation interface, including one or more communication networks. For instance, mobile device(s) 102 can be implemented as a smart phone, tablet, personal digital assistant (PDA), laptop, or most any other network-enabled computing device (e.g., see FIG. 5, infra).

Figure 5:
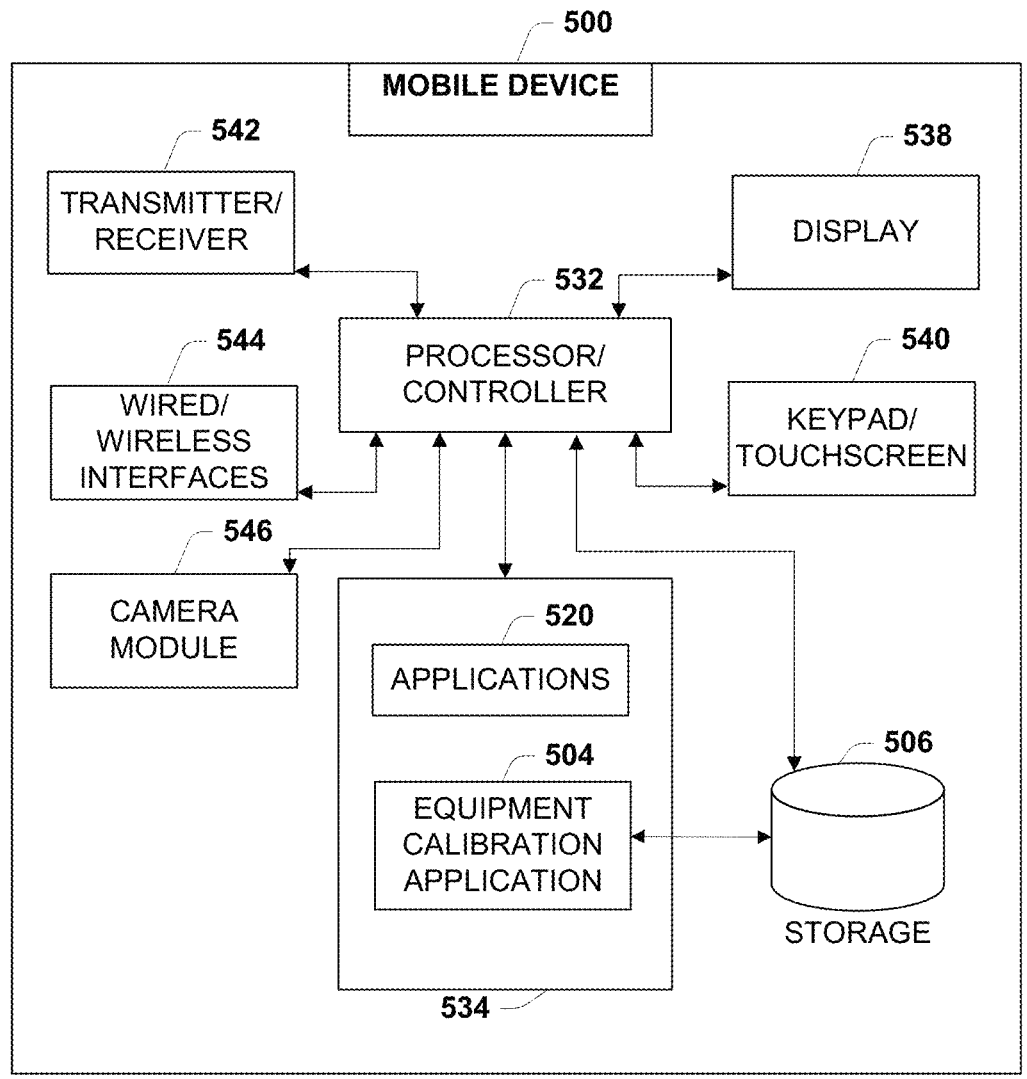
FIG. 5 illustrates a block diagram of an example mobile device for implementing one or more disclosed embodiments.

An equipment calibration application 104 may be stored (e.g., in mobile device data store(s) 120; in a cloud server, etc.) and executed on the mobile device 102 (e.g., from an operating memory or system memory of mobile device(s) 102—not depicted, but see FIG. 5 or analogous mobile device memory structures known in the art or made known to one of skill in the art by way of the context provided herein). Equipment calibration application 104 may be retrieved from a mobile application store, such as a network service providing applications compatible with the iOS system by Apple Computer, the Android mobile device operating system, or other suitable operating system for a mobile computing device.

Computing environment 100 can also include one or more servers 106. Servers 106 are responsible for authentication of mobile device(s) 102 (or authentication of a user of mobile device(s) 102), and interaction with server data store(s) 110. Servers 106 can include mobile application servers, web servers, database servers or other suitable hardware or software capable of accepting requests from mobile device(s) 102, and responding with data, applications, process results, reply commands, acknowledgments, instructions, and so forth.

The equipment calibration application 104 on the mobile device(s) 102 communicates with the servers 106. One possible communication between a mobile device 102 and a server(s) 106 may be in the form of a data packet adapted to be transmitted between two or more computer processes. The equipment calibration application 104 can establish a connection with the server(s) 106, and can retrieve data, store data, submit processing requests, provide data in conjunction with a processing request, and the like.

The computing environment 100 includes a communication framework 108 that can be employed to facilitate communications between the mobile device(s) 102 and the servers 106. In some embodiments, a communication framework 112 is provided to facilitate communication between mobile device(s) 102 and outdoor power equipment 114. Computing environment 100 can be implemented without communication framework 112 and interconnection of mobile device 102 with outdoor power equipment 114, in some embodiments.

Communication framework 108 will typically be a wide area network and communication framework 112 will typically be a short range wired or wireless network, although the subject disclosure is not limited so such embodiments. Rather, in various embodiments either communication framework 108 or communication framework 112 or both can include wired/wireless connectivity to a local area network (LAN) or larger networks, e.g., a wide area network (WAN) which may connect to a global communications network, e.g., the Internet. As more specific examples, communication framework 108/112 can provide communication utilizing: any suitable private or commercial cellular voice or data network (second generation (2G), 3G, 4G, WiMAX, 4G long term evolution (LTE), 5G, and so forth), a satellite voice or data network, Bluetooth®, or Wi-Fi technology IEEE 802.11(a, b, g, n, . . . ), infrared, Ultra Wideband (UWB), or a wired connection such as a universal serial bus (USB) connection, Ethernet connection (e.g., Cat 3, Cat 5, Cat 5e, Cat 6, Cat 6A, and others), or the like, or a suitable combination of the foregoing. Data may be communicated between and among the mobile device 102, the equipment calibration application 104, the servers 106 and the outdoor power equipment 114 via the communication framework 108 or communication framework 112 utilizing networks, which are accessible to and are compatible with the mobile device(s) 102.

In various embodiments, a camera module of mobile device(s) 102 can be utilized to capture image data of vegetation cut, trimmed, mowed, or otherwise operated upon by outdoor power equipment 114. The camera module (not depicted, but see FIGS. 3 and 4, infra) can be utilized to capture an image of the vegetation in comparison with a means for measuring the vegetation, in one or more embodiments. Such means for measuring the vegetation can include a distance scale (e.g., metric scale, or other standard for measuring distance), a ruler, a straight edge, or the like. In at least one embodiment, the vegetation can be measured with a prism gauge, and the image data can pertain to an image of the vegetation within a display field or viewing field of the prism gauge. In this latter embodiment, the prism gauge can project a distance scale (or other suitable means for measuring the vegetation) onto the vegetation, facilitating a comparison of the cut of the vegetation with a straight edge, a metric scale, and so forth.

Image data captured by mobile device(s) 102 can be transmitted over communication framework 108 to server(s) 106. Server(s) 106 can execute an algorithm configured to determine an output result of applying outdoor power equipment 114 to the vegetation. Output results can include a quality-of-cut metric of the vegetation, uniformity-of-cut metric of the vegetation, or the like, or a suitable combination of the foregoing. As one example, the algorithm can perform a statistical analysis of disparity of height of subsets of the vegetation relative other subsets of the vegetation, quantified by comparison with the means for measuring the vegetation (e.g., a distance scale projected by the prism gauge). A result of the statistical analysis can be stored in server data store(s) 110 as a quantified uniformity-of-cut metric, in some embodiments. Other suitable mathematical or statistical algorithms for determining uniformity-of-cut, known to one of skill in the art or made known by way of the teaching herein, are considered within the scope of the present disclosure as well.

In alternative or additional embodiments, the algorithm can be configured to measure a sharpness of cut of the vegetation. Sharpness of cut can be a qualitative or quantitative analysis of cut-ends of subsets of the vegetation, identifying relative (or overall) quality-of-cut as a function of fraying of the cut-ends of the subsets of the vegetation. As one example, fraying of cut-ends can be determined by comparison of geometric comparison of image data of the cut-ends versus geometric comparison of non-cut portions (e.g., blades) of the vegetation, and statistical or mathematical analysis of degree of continuity of that geometric comparison. Other suitable mathematical or statistical algorithms for determining quality-of-cut, known to one of skill in the art or made known by way of the teaching herein, are considered within the scope of the present disclosure as well In some embodiments, results of image data analysis performed by server(s) 106 can be stored at server data store(s) 110 to facilitate comparison of output results of outdoor power equipment 114 on vegetation. In an embodiment, analysis of different output results over time can facilitate comparative analysis of the output results as a function of time. In some embodiments, mobile device 102 can provide one or more settings data pertaining to settings of mechanical parameters of outdoor power equipment 114 in conjunction with image data transmitted to server(s) 106 (e.g., see FIGS. 3 and 4). In such embodiments, output results stored at server data store(s) 110 can be associated with the one or more settings data to facilitate analysis of output results as a function of mechanical parameter settings of outdoor power equipment 114.

In additional embodiments, vegetation data pertaining to a given output result can be transmitted to server(s) 106 to facilitate analysis of output results as a function of vegetation type. Examples include types of grass being mowed, types of leaves, trees or bushes being trimmed, types of turf or applications being maintained (e.g., putting green, fairway, tee box, tennis court, soccer field, baseball outfield, football field, etc.), soil conditions of such vegetation (e.g., soil density, soil moisture, soil compressibility, and so forth), or the like or suitable combinations of the foregoing. Such data can be stored with results of image data analysis to facilitate analysis of output results as a function of vegetation data.

In still further embodiments, environmental conditions data concurrent with a given output result can be transmitted to server(s) 106 to facilitate analysis of output results as a function of one or more environment conditions. Suitable environment conditions can include weather information such as atmospheric conditions, turf moisture information, vegetation moisture information, temperature information, barometric pressure information, seasonal information, or the like. Environment conditions data can be entered by a user into equipment calibration application 104 on a user interface of mobile device(s) 102, in an embodiment. In other embodiments, acquisition of environment data can be automated. For instance, environment data can be automatically acquired by equipment calibration application 104 (e.g., by connection over the Internet to a local weather database, or other source of contemporaneous and local environment data pertinent to the output result of the vegetation), as one example. In other examples, environment data or can be automatically acquired by one or more sensors in a vicinity of the vegetation (e.g., see FIG. 2, infra). As suitable, the environment data can be transmitted by equipment calibration application 104 or mobile device(s) 102 via communication framework 108 to sensor(s) 106, or by environment sensors utilizing another communication framework coupled with server(s) 106, independently of mobile device(s) 102. In an embodiment, a suitable combination of time data, mechanical parameter settings data and environment data, or other suitable data, can be stored at server data store(s) 110 to facilitate output results analysis as a function of combinations of the foregoing.

Output results of outdoor power equipment 114 on vegetation, generated by server(s) 106, can be transmitted to mobile device(s) 102. This facilitates consumption of output results data on equipment calibration application 104, as one example. In other embodiments, output results data can be transmitted by server(s) 106 to a third party, such as a help desk center associated with a manufacturer of outdoor power equipment 114, an electronic device (e.g., a computer, a second mobile device, etc.) registered with server(s) 106 pertaining to a quality consultant for outdoor power equipment 114, and so forth. A combination of the foregoing can be implemented in further embodiments.

In alternative or additional embodiments, historical output results stored at server data store(s) 110 can also be provided by server(s) 106. This can enable a given output result to be compared with the historical output results. Moreover, various metadata pertaining to one or more conditions associated with respective output results (e.g., time, time of day, day of week, season of the year, environment conditions, settings of outdoor power equipment, and so forth) can be provided with historical output results in such embodiments. This can enable consumption of the output results in comparison with the historical output results as a function(s) of the metadata, or subsets of the metadata, including user-selectable subsets of the metadata (e.g., selected at equipment calibration application 104). Accordingly, system 100 can facilitate a comprehensive analysis of a given output result of outdoor power equipment 114 on vegetation, compared with other output results as a function of: varying types of vegetation, different times of the year, in different environmental conditions and as a function of varying mechanical parameters of outdoor power equipment 114, soil conditions, type of application being maintained, or the like.

In alternative or additional embodiments, server(s) 106 can utilize output results data to generate adjustment data or optimization data for one or more mechanical parameters of outdoor power equipment 114. Adjustment data or optimization data can be extracted from a look-up table in an embodiment, that correlates different output results with different adjustments of outdoor power equipment 114. Where current settings data of mechanical parameters of outdoor power equipment 114 are provided by equipment calibration application 104, server(s) 106 can generate adjustment(s) to the current settings data based at least in part on the output results. In at least one embodiment, an optimal setting result can be generated instead (e.g., where no prior settings data is provided to which a modification can be suggested).

To acquire current settings data for outdoor power equipment 114, equipment calibration application 104 can be programmed to communicatively connect by communication framework 112 to a control unit 116 of outdoor power equipment 114. The equipment calibration application 104 can be programmed to read current settings data from an outdoor power equipment data store(s) 118, in an embodiment, or acquire such data from control unit 116. Alternatively or in addition, current settings data can be input by a user of mobile device(s) 102, retrieved from mobile device data store(s) 120, and so forth.

Current settings data can include a variety of data pertaining to outdoor power equipment 114. Further, current settings data can include identifiers for distinguishing among different types of outdoor power equipment 114 in various embodiments (e.g., model number(s), serial number(s), manufacturer identifier(s), etc.). Equipment calibration application 104 can also utilize data pertaining to mechanical parameters of outdoor power equipment 114, which can vary as a function of type of outdoor power equipment 114. As utilized herein, a mechanical parameter refers to any fixed or adjustable physical characteristic of outdoor power equipment 114. Available mechanical parameters and their characteristics, as well as adjustability, can often vary per type of outdoor power equipment 114. For instance, in the case of an Infinicut walk-behind lawnmower, mechanical parameters employed by equipment calibration application 104 can include: a height of cut setting, a cutting reel of a set of cutting reel cassettes, a rear roller position, a bedblock eccentricity angle, a number of blades on a bedknife, a bedknife attitude angle, a behind center distance (BCD) of bedknife setting, a reel motor counterbalance of a set of reel motor counterbalances, a parallelism metric of the bedknife, a drive speed (e.g., a translational speed or walking speed of the outdoor power equipment 114 relative to ground as a constant), a cutting reel speed, a frequency of clip metric, or the like or a suitable combination of the foregoing. In further embodiments, equipment calibration application 104 can be programmed to acquire (e.g., from Internet database) or receive (e.g., from user input, from sensors, etc.) data pertaining to environmental conditions, type of vegetation being cut, vegetation load on a bedknife, as well as other suitable machine parameters, environmental parameters, vegetation parameters, and so forth. As described above, such data can be transmitted to server(s) 106 in conjunction with image data (e.g., see FIGS. 3 and 4, infra).

As introduced briefly above, server data store(s) 110 can comprise a database that stores calibration settings for respective groups of mechanical parameters for a variety of types or models of outdoor power equipment 114 (e.g., one or more groups of mechanical parameter settings per type of outdoor power equipment 114). Further, the database can comprise adjustment data as a function of one or more input conditions. As an example, the database can be programmed to generate optimal data for a mechanical parameter setting(s) as a function of one or more input conditions or constraints. Suitable input conditions can include, but are not limited to: achieving a target output result analysis metric (e.g., quality-of-cut, uniformity-of-cut, or the like) for a current mechanical parameter setting (e.g., a current height-of-cut setting), as a function of one or more input parameters. Suitable input parameters can include, but are not limited to, data representing: a type of outdoor power equipment 114, an environmental condition(s), a fixed mechanical parameter(s) or fixed mechanical parameter setting(s), an adjustable mechanical parameter(s) or adjustable mechanical parameter setting(s), an interchangeable part(s) (e.g., a cutting reel, a counterbalance, and so forth), a target performance metric for the outdoor power equipment 114 (e.g., a target quality-of-cut metric, or the like), a target mechanical output for the outdoor power equipment 114 (e.g., a target height of cut, or similar), or other suitable input parameters, or a suitable combination of the foregoing. Thus, as one illustrative example, the database can be programmed to store or generate an adjustment to a first mechanical parameter setting (e.g., a frequency of clip) in response to determination of a uniformity-of-cut metric by server(s) 106, for a given input parameter data received from equipment calibration application 104 and specifying: a current value of the mechanical parameter, a given type of machine (e.g., Infinicut lawnmower), a particular environmental condition (that can alternatively be received from an external environment sensor, see FIG. 2, infra and specifying e.g., current turf moisture), and a target mechanical output (e.g., a target height-of-cut, etc.) for a set of fixed mechanical parameter values (e.g., cutting reel speed and drive speed). As another illustrative example, the database can be programmed to generate optimal setting data for the first mechanical parameter setting in response to a determined quality-of-cut analysis (e.g., a measurement of frayed ends), either alone or in conjunction with input parameter data specifying: the type of machine, the particular environmental condition and a target quality-of-cut metric (e.g., a target metric of frayed ends) for a given cutting reel speed and drive speed. Examples of other output results for different combinations of input data (input parameters and input conditions) are described herein; however, these are in no way limiting and the scope of the disclosure is intended to encompass all suitable combinations of input parameters, conditions and the like, and all suitable adjustment data outputs or optimization data outputs disclosed herein or that would be reasonably conveyed to one of ordinary skill in the art given a suitable expertise and knowledge of the art.

In an alternative embodiment(s), a database for storing adjustment data or optimization data as a function of input data can be embodied as a look-up table 122 stored in mobile device data store(s) 120. In this embodiment(s), output results data provided by server(s) 106 can be employed by equipment calibration application, optionally in conjunction with one or more current settings data of mechanical parameters of outdoor power equipment 114, environment conditions, turf conditions, and so forth, to extract the adjustment data or optimization data from look-up table 122. In other embodiments, look-up table 122 can be stored on server data store(s) 110 and mobile device(s) 102 can access look-up table 122 by way of communication framework 108 and server(s) 106.

Figure 2:
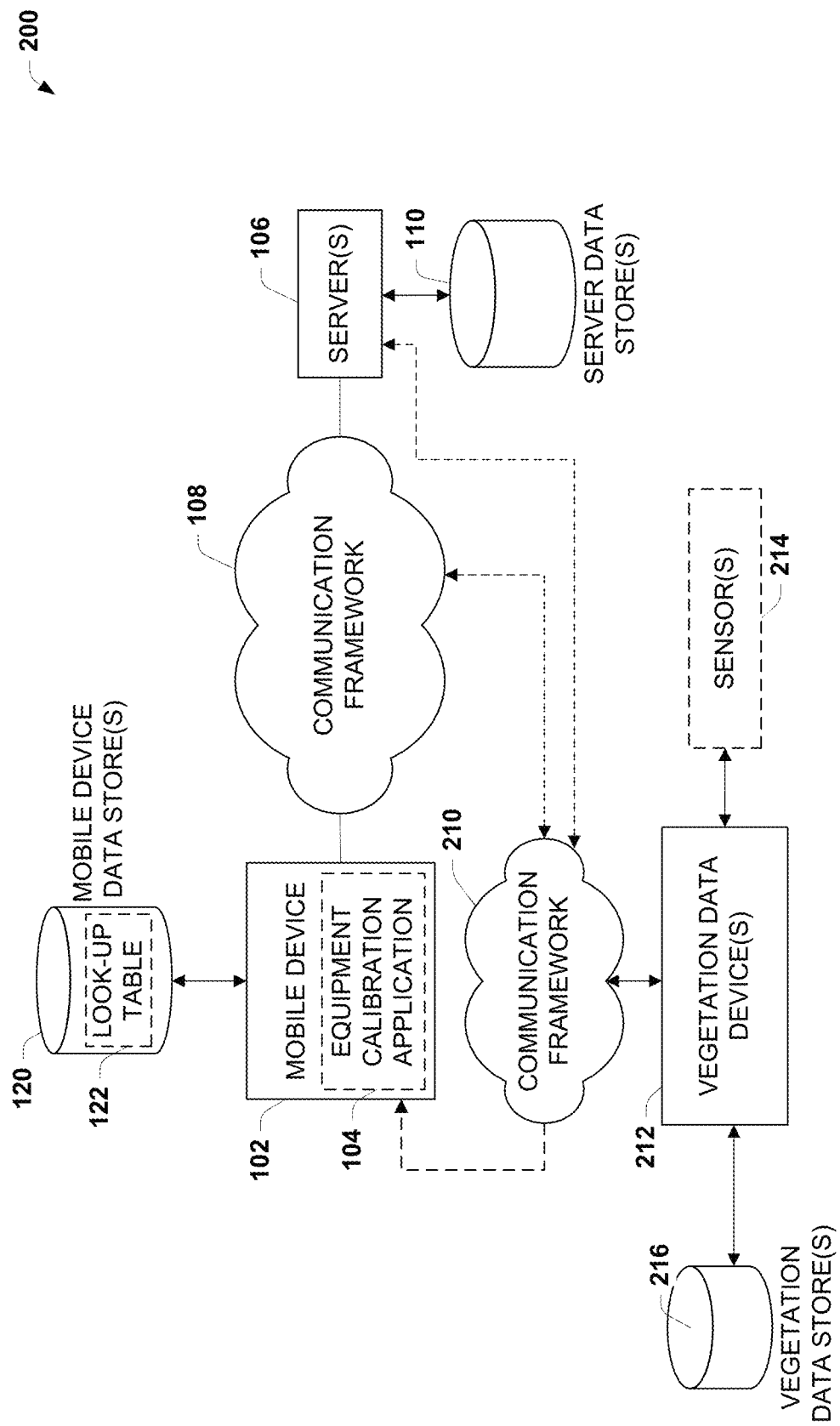
FIG. 2 illustrates a block diagram of a system that generates a quality of cut analysis utilizing automated acquisition of environment conditions, in an embodiment.

FIG. 2 illustrates a block diagram of an example network computing environment 200 according to further embodiments of the present disclosure. Network computing environment 200 can facilitate implementation of automated data acquisition embodiments described herein. For instance, network computing environment 200 can facilitate automated acquisition of data pertaining to environment conditions, vegetation conditions, turf conditions, and so forth in conjunction with generating objective output results analysis of outdoor power equipment, or calibration of outdoor power equipment at least in part based on such output results analysis.

Further to mobile device(s) 102 connected to server(s) 106 by communication framework 108 as illustrated in FIG. 1, provided is a vegetation data device(s) 212. In an embodiment, vegetation data device(s) 212 can be embodied by one or more sensor(s) 214 configured to acquire environmental conditions data pertaining to vegetation maintained by an outdoor power equipment. In other embodiments, vegetation data device(s) 212 can be embodied by one or more data server devices that acquire data captured by sensor(s) 214 and store the data at a vegetation data store(s) 216. Regardless of embodiment, vegetation data device(s) 212 can provide captured sensor data to mobile device(s) 102 by communication framework 210, or to server(s) 106 by communication framework 210 (separate from or in conjunction with communication framework 108). The dashed lines connecting communication framework 210 to mobile device(s) 102, communication framework 108 and server(s) 106 represent the optional/alternative nature of any given route of communication with vegetation data device(s) 212.

Sensors 214 are depicted in dashed lines to indicate the optional embodiment within vegetation data device(s) 212, or as separate devices, or a combination of the foregoing. Sensors 214 can include a wide variety of weather, environment, vegetation or turf data acquisition devices. Examples can include sensors for acquiring data pertaining to various weather conditions (e.g., wind, precipitation, pressure, and so forth), temperature conditions, temporal conditions (e.g., time of day, day of week, week of month, month of year, season of year, and so forth), moisture conditions of vegetation or turf, data pertaining to health of vegetation, and so forth. Where sensor(s) 214 are embodied separately from vegetation data device(s) 212, wired or wireless data transfer (or manual data transfer, such as by memory card or the like) can facilitate transfer of data captured by sensor(s) 214 to vegetation data device(s) 212. Vegetation data device(s) 212 can store received data at vegetation data store(s) 216, in an embodiment, as well as make received data available to mobile device(s) 102 or server(s) 106 in other embodiments.

Mechanically, sensor(s) 214 can be embodied as fixed sensors or mobile sensors. In the former case, fixed sensors can be placed in a given location and continue to acquire data measured at the given location. In the latter case, mobile sensors can be mounted on an outdoor power equipment, mounted on a mobile ground device (e.g., golf cart, wagon, motorcycle, 4-wheel device, car, truck, etc.) or a mobile aerial device (e.g., an aerial drone, or the like). As one illustrative example, a set of cameras mounted on an aerial drone can capture image data of vegetation within respective spectra calibrated for each camera. Example spectra include visible light or subsets thereof (e.g., green light, yellow light, red light, and so forth), and invisible light such as infrared, near-infrared, and so forth. In at least one embodiment, a set of cameras calibrated respectively for green light, red light, far red light and near infrared light can be utilized to obtain visual data of vegetation, as well as invisible data of vegetation in frequencies from which photosynthetic activity can be derived, and health of vegetation inferred.

In general, network computing environment 200 can utilize any suitable sensor for acquiring data specified herein, and is not limited by a type of sensor. Rather, other sensors known in the art or made known to one of skill in the art by way of the context and teaching provided herein are considered within the scope of the present disclosure.

Figure 3:
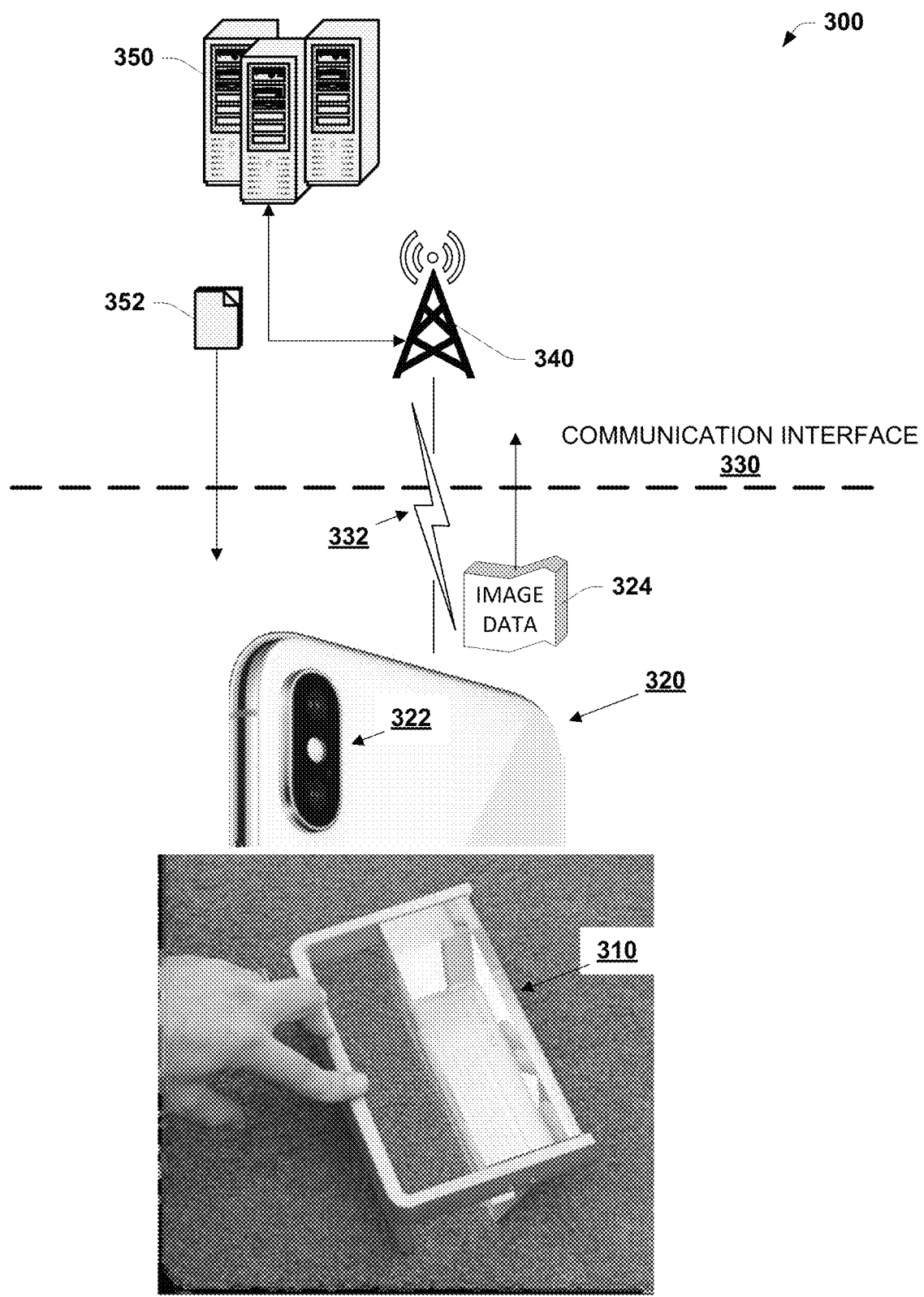
FIG. 3 illustrates a diagram of a network environment facilitating objective analysis of quality-of-cut metrics according to further embodiments.

FIG. 3 depicts a block diagram of an example network computing environment 300 for implementing additional embodiments of the present disclosure. For example, network computing environment 300 can facilitate analysis of output results of power equipment utilizing an objective performance metric of the power equipment. Output result data can be returned singly, or can be returned in conjunction with stored data of other output analysis results to facilitate comparative data consumption of power equipment output results as a function of one or parameters, such as time, environment condition, type of vegetation, mechanical parameters of power equipment, type of power equipment, and so forth. In alternative or additional embodiments, output results can be utilized to facilitate calibration of power equipment, which can be a single adjustment calibration, in an embodiment, or can be an iterative adjustment calibration, in which successive objective performance metrics of prior calibration adjustments are utilized to improve or optimize power equipment operation (e.g., see method 700 at FIGS. 7 and 8, infra).

Network computing environment 300 can comprise a prism gauge 310 for projecting an image of vegetation (e.g., grass, etc.) onto a display field superimposed over height markings. The prism gauge is a device for obtaining a measurement of uniformity-of-cut of the vegetation, as one example. To obtain an objective analysis of the uniformity-of-cut, the image of the vegetation within the display field of the prism gauge over the height markings is captured with a camera module 322 of an image (or video) capturing device 320. Image capturing device 320 can be a smart phone in one or more embodiments, though the subject disclosure is not limited thereto. The captured image is digitized to generate image data 324, which contains a digital representation of the captured image generated by image capturing device 320. Image capturing device 320 establishes a communication interface 330 with a remote communication device 340 (e.g., a cell tower, a wireless gateway, a base station, a satellite, and so forth) to create a wireless communication link 332 between the image capturing device 320 and the remote communication device 340. Image data 324 is transferred by way of the wireless communication link 332 to remote communication device 340, which in turn provides the image data 324 to one or more servers 350.

Servers 350 can store an algorithm designed to analyze image data 324 and generate output data indicative of one or more characteristics of the image data 324. In the instant example, the algorithm can be programmed to perform a uniformity-of-cut determination of the image of vegetation contained in the image data 324. Output data representative of a result of the uniformity-of-cut determination is provided in an output file 352 and transmitted by remote communication device 340 over wireless communication link 332 to image capturing device 320. The output data represents an objective analysis of the uniformity-of-cut measurement. This objective analysis can mitigate or avoid subjective determinations of uniformity-of-cut that result, for instance, when different persons view the image of the vegetation within the prism gauge. For very fine uniformity-of-cut determinations, small variability in subjective impressions of the prism gauge image can lead to differing impressions of the uniformity-of-cut. For instance, different people may hold a prism gauge at slightly different angles, look at the prism gauge display field at slightly different angles, or have various degrees of optical astigmatisms that yield differing results of a line or a uniformity-of-cut. Taking image data from a single viewpoint with a single camera module 322 can minimize variability in image data, leading to improved objectivity in the uniformity-of-cut metric, and overall improvement in high precision turf management applications for power equipment.

In some embodiments, output file 352 can include stored output data pertaining to other image data of other instances of vegetation. The other instances of vegetation can also include one or more metadata, pertaining to time of image capture (including, e.g., time of day, season of year, or any other suitable time), environment conditions pertaining to image capture (e.g. acquired by sensors 214 of FIG. 2, supra), settings of power equipment devices associated with the image capture, and so forth. A calibration application (not depicted, but see equipment calibration application 104 of FIG. 1 or 2) can facilitate consumption of the output data in comparison with historical data as a function of one or more functions described herein, facilitating an intelligent and diverse analysis of the output data and its comparison with other objective analysis of output results of power equipment.

In various embodiments, image capturing device 320 can utilize the output data in conjunction with calibrating a power equipment. For instance, the output data representing uniformity-of-cut can be entered as an input to a look-up table that correlates uniformity-of-cut with one or more adjustments to mechanical parameters (e.g., frequency of clip, cutting reel speed, walking speed, cassette reel, or the like, or a suitable combination of the foregoing) of the power equipment. Adjustment to the one or more mechanical parameters can be executed automatically by way of a calibration application operating on image capturing device 320 communicatively coupled with a control unit of the power equipment, or manually by display of the adjustment on a graphical display of a mobile device, as described herein. Once the power equipment is adjusted, further image data can be captured by image capturing device 320 of the adjusted power equipment, for further refinement of the mechanical parameters, as needed.

In one or more embodiments, the algorithm stored by servers 350 can employ machine learning, machine intelligence, or similar algorithms to improve accuracy of uniformity-of-cut calculations. Improvements can be generated by building a mathematical model of training data from a pool of increasing image data and uniformity-of-cut determinations from successive applications of the algorithm on different image data. Mathematical optimization algorithms can be incorporated to improve upon performance metric analysis results over time, increasing accuracy and value of the analysis results with increasing usage.

Figure 4:
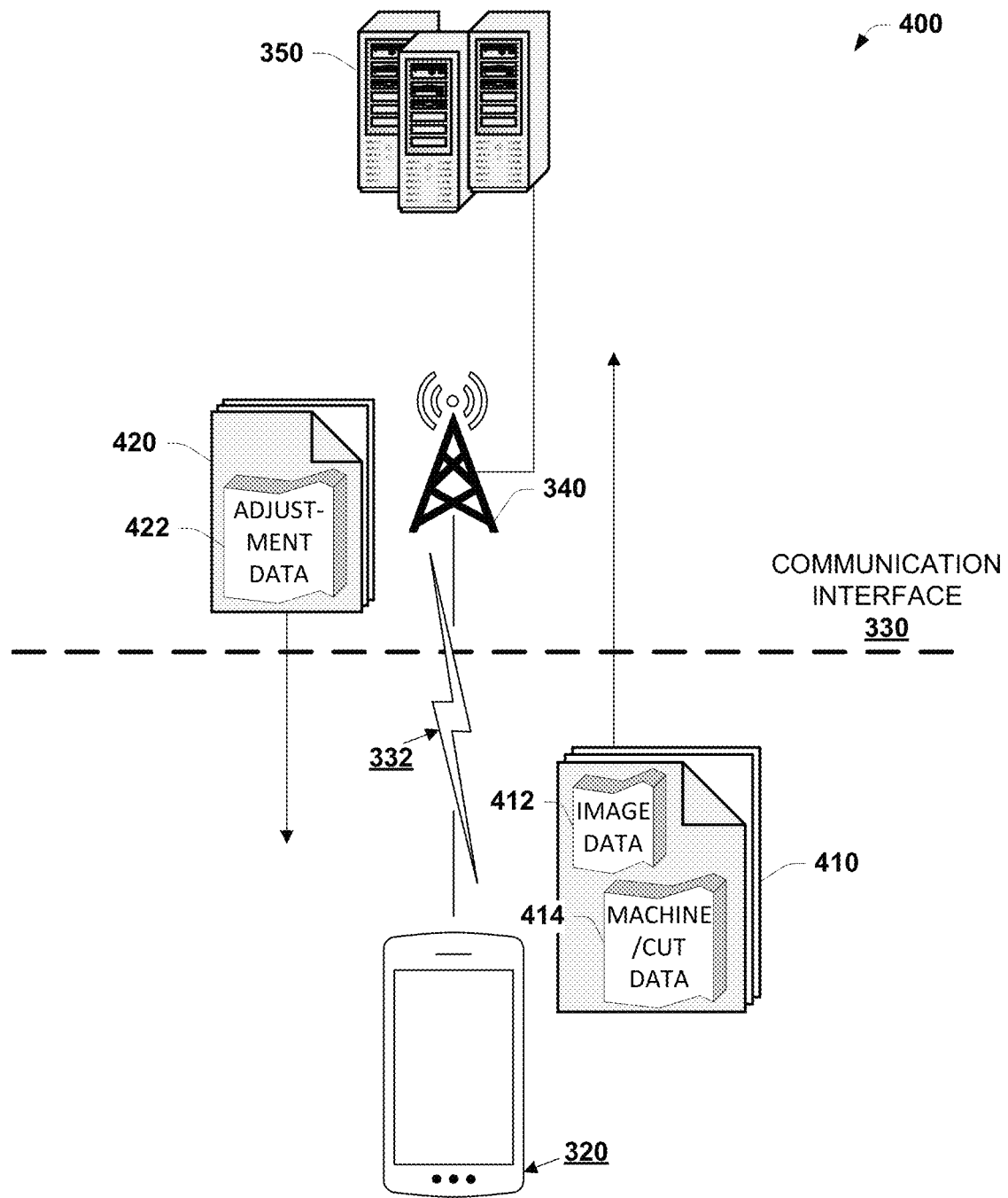
FIG. 4 depicts a diagram of a network environment for calibrating a power equipment utilizing image data of vegetation cut by the power equipment.

FIG. 4 depicts a block diagram of an example network computing environment 400 for implementing additional embodiments of the present disclosure. For example, network computing environment 400 can facilitate calibration of power equipment by generating an objective performance metric for the power equipment (also referred herein as an output result or output result analysis for the power equipment) in conjunction with recommended adjustment data. The recommended adjustment data can be based on a set of input parameters, input conditions or the like, in addition to performance metric data. In an embodiment, the recommended adjustment data can be derived from a database having adjustment values for one or more machine parameters correlated with input data sets and performance metric data. In another embodiment, the recommended adjustment data can be derived from machine learning that is initially programmed with the foregoing database as seed data, and builds training data from successive performance metric analysis results, recommended adjustment data and subsequent performance metric analysis, combined with machine optimization algorithms to improve upon past results.

As illustrated, network computing environment 400 can comprise an image capturing device 320 embodied, as an illustrative example, as a smart phone. Image capturing device 320 can execute an equipment calibration application (not depicted, but see equipment calibration application 104 of FIG. 1, supra, among others) to acquire current settings for mechanical parameters of a power equipment. In some embodiments, image capturing device 320 can also obtain sensor input data or user input data pertaining to environment conditions, vegetation data, or manually adjusted mechanical parameters of the power equipment. The equipment calibration application can generate a machine/cut data file 414 including relevant data, including machine data, environment data and vegetation data, among others. Further, image capturing device can capture an image of the vegetation recently cut by the power equipment (e.g., within a display field of a prism gauge), digitize the image and generate image data 412. Image data 412 and machine/cut data file 414 can be included in an upload message 410 transmitted on wireless communication link 332 to a remote communication device 340.

Remote communication device 340 can provide the upload message 410 to servers 350. Servers 350 can analyze the image data as described herein to determine a performance metric for the vegetation cut by the power equipment. In addition, servers 350 can utilize this performance metric and the machine/cut data file 414 to generate adjustment data indicative of a recommended adjustment in a mechanical parameter (e.g., frequency of clip, etc.) of the power equipment.

Adjustment data 422 is transmitted in a download message 420 to image capturing device 320. Moreover, the adjustment data 420 (and optionally the determined performance metric) can be displayed on the equipment calibration application of image capturing device 320. A user of image capturing device 320 can elect to apply the adjustment data to the power equipment automatically (e.g., by a communication framework 112 connecting equipment calibration application 104 to control unit 116 of outdoor power equipment 114), or the user can apply the adjustment manually consistent with the adjustment data. Successive iterations of adjustment to the power equipment, use of the power equipment, image capture of vegetation cut by the power equipment and analysis by servers 350 can progressively optimize performance of the power equipment. It should be noted that different performance metrics can be selected, along with different corresponding image data for determining desired performance of the power equipment. In some embodiments, the equipment calibration application allows a user to select among desired performance metrics/output results (e.g., uniformity-of-cut, height of cut, precision of cut—incorporating sharpness of cut and avoiding frayed or split blades of grass, for example—or other metrics) and suitable image data for analyzing the selected performance metric.

FIG. 5 is a functional block diagram of a mobile device 500. The mobile device 500 includes a controller 532 that controls the overall operation of the mobile device 500. The controller 532 can include most any commercially available or custom microprocessor or micro controller. Memory 534 is operatively connected to the controller 532 for storing control programs, applications, and data (collectively, applications 520) used by the mobile device 500. The mobile device 500 can be configured to run the equipment calibration application 504, handle voice communications, transmit, receive and process data, such as sensor data, map data, text messages, electronic mail messages, image files, video files, audio files, and the like.

Memory 534 is operatively connected to the controller 532 for storing applications, control programs and data used by the mobile device 500. The memory 534 is representative of the overall hierarchy of memory devices containing software and data used to implement the functionality of the mobile device 500 in accordance with one or more aspects described herein. The memory 534 can include, for example, RAM or other volatile solid-state memory, flash or other non-volatile solid-state memory as operational memory, and mobile device 500 can also include storage 506, such as a magnetic storage medium, disk storage, optical storage, removable storage media, or other suitable storage means.

In an embodiment, the memory 534 stores application programs 520, including an equipment calibration application 504, and application program data. The application programs 520, including the equipment calibration application 504, can access software routines, stored in the memory 534, and in the data stores 506, via the controller 532, for communicating with devices such as the display 538 and the keypad/touch screen 540, input/output ports, the transmitter/receiver 542, wired/wireless interfaces 544, camera module 546, a location determination element, such as a global positioning system (GPS), and most any other user interface components and/or devices.

The application programs 520, including the equipment calibration application 504, comprise programs that implement various features of the mobile device 500, such as voice calls, e-mail, Internet access, multimedia messaging, contact manager and the like. The equipment calibration application 504 comprises a program, logic routine or code that provides users with on-demand operational status, maintenance records, maintenance activity alerts/notifications, access to operator's manuals, and instructions concerning critical and non-critical components and operation of outdoor power equipment as described herein (e.g., outdoor power equipment 114 of FIG. 1, supra, among others disclosed herein). In an embodiment, the equipment calibration application 504 comprises an interactive program wherein information is provided or exchanged between a user via the mobile device 500 and the outdoor power equipment 108 in real-time, in conjunction with calibrating one or more mechanical parameters of outdoor power equipment 108, as a function of input parameters, constraints or performance metrics as described herein. Moreover, equipment calibration application 504 can comprise a data analysis program that displays, depicts, charts, maps or otherwise provides for consumption output results data pertaining to analysis of image data of different results of application of power equipment on vegetation, based on various conditions as described herein. In still other embodiments, information can be provided or stored for later retrieval.

In particular embodiments, wired/wireless interfaces 544 of the mobile device 500 can include one or more local wireless interfaces 544, such as an infrared transceiver or an RF adapter, for example, a Bluetooth® adapter, WLAN adapter, Ultra Wideband (UWB) adapter and the like, or suitable combinations thereof, for establishing communication with a network, an intranet, the Internet, the outdoor power equipment 114, an accessory, another mobile device, a computer, or most any other electronic device. Wired/wireless interfaces 544 can additionally include an interface suitable for communication within a cellular network or other wireless wide-area network. Wired interfaces of wired/wireless interfaces 544 can be employed as an alternative to, or in addition to, the wireless interfaces in at least some disclosed embodiments. Wired interfaces can include a USB interface, Ethernet interface, a proprietary interface (e.g., a power and data port compatible with Apple Computer mobile devices 500), or the like or suitable combinations of the foregoing.

The transmitter/receiver 542 and the wireless interface(s) 544 can include transmit and receive circuitry, and a serial interface for communication with the controller 532. The mobile device 500 can also include one or more suitable antennas (not shown) coupled to the transmitter/receiver 542 or wireless interfaces 544 for receiving and transmitting signals. In an embodiment, the transmitter/receiver 542 and the wireless interfaces 544 can be combined in a component.

In further embodiments, applications 520 of mobile device 500 can include instructions executed by processor/controller 532 to implement operations of mobile device 500. These operations can comprise acquiring, by way of camera module 546, image data of vegetation. For example, the vegetation can be vegetation having been trimmed by a power equipment. Further, the operations can comprise at least one of: acquiring, by processor 532, settings data pertaining to a current setting of a mechanical parameter of the power equipment or acquiring, by the processor 532, environment data (optionally in conjunction with one or more sensors 214 of FIG. 2, supra) pertaining to the vegetation or a climate affecting the vegetation. Additionally the operations can comprise forming, utilizing wired/wireless interfaces 544, a communication link with a server device remotely located from the mobile device and transmitting by the wired/wireless interfaces 544 the image data and the settings data or the environment data to the server device. Mobile device 500 can then receive, utilizing wired/wireless interfaces 544, a quality-of-cut determination for the image data of the vegetation in response to transmitting the image data and the settings data or the environment data. Further to the above, the operations can comprise outputting, at a graphical display 538 of the mobile device 500 data indicative of the quality-of-cut determination In an additional embodiment(s), the operations can comprise receiving, by the wired/wireless interfaces 544, adjustment data for modifying the current setting of the mechanical parameter, or for setting a second mechanical parameter of the power equipment. The operations can also comprise forming a second communication link with a control device of the outdoor power equipment and transmitting to the control device the adjustment data, facilitating automated adjustment of the mechanical parameter or the second mechanical parameter consistent with the adjustment data. In still another embodiment, the operations can comprise outputting the adjustment data at the graphical display 538 of the mobile device 500 and outputting an instruction to manually adjust the mechanical parameter or the second mechanical parameter consistent with the adjustment data.

In another embodiment, the operations can comprise receiving stored quality-of-cut data in conjunction with the quality-of-cut determination for comparison of the quality-of-cut determination with the stored quality-of-cut data. In an embodiment, the stored quality-of-cut data delineates quality-of-cut determinations as a function of a parameter selected from a group consisting of: time, environmental condition, type of vegetation, season of the year, time of day, mechanical parameter setting of the outdoor power equipment and a suitable combination of the foregoing. In yet another embodiment, wired/wireless interfaces 544 can be employed to communicatively couple the mobile device to a measurement device configured to generate the environment data pertaining to the vegetation or a climate affecting the vegetation, wherein the mobile device acquires the environment data from the measurement device by way of wired/wireless interfaces 544.

In one or more specific embodiments, the data pertains to the instance of vegetation and includes a type of grass associated with the vegetation or a moisture content associated with the vegetation (e.g., moisture content of turf, dirt, ground, etc. on which the vegetation is growing). Alternatively or in addition, the data can pertain to the machine for mowing the vegetation and include a number of cutting blades on a cutting reel of the machine, a target height of cut of the machine, or a drive speed of the machine. As yet other examples, the determined value of the mechanical parameter of the machine is a first value of a frequency of clip of the machine or a second value of a cutting reel speed of the machine. In at least one embodiment, the additional data can include both the first value and the second value. In yet other examples, the determined value of the mechanical parameter of the machine is selected from a group consisting of: a first value of a frequency of clip of the machine, a second value of a cutting reel speed of the machine, a third value of a rear roller position of the machine, a fourth value of a bedknife attitude angle of the machine and a fifth value of a cutting reel cassette identifier of a set of cutting reel cassette identifiers. For instance, the determined value of the mechanical parameter of the machine can include two or more values selected from the foregoing group. In some embodiments, the determined value of the mechanical parameter can be a similar mechanical parameter and value, or any suitable combination of the foregoing.

Generally, the illustrated embodiments are not provided as strict limitations on how the disclosed aspects can be practiced by one of ordinary skill in the art, but are intended to be provided as examples that can be modified, interchanged, added to or subtracted from as would be suitable to one of ordinary skill in the art. As a further example, components of disclosed devices can be implemented as connected to other components rather than included within the parent device. For instance, storage 506 can be external to mobile device 400 in one embodiment. Alternatively, the opposite orientation can be implemented within the scope of the disclosure: one component (e.g., sensor(s) 214; vegetation data store(s) 216) depicted separate from another component (e.g., vegetation data device(s) 212) can be aggregated as a single component in some embodiments. Additionally, it is noted that one or more disclosed processes can be combined into a single process providing aggregate functionality. Still further, components of disclosed machines/devices/networks/applications can also interact with one or more other components not specifically described herein but known by those of skill in the art.

In view of the exemplary diagrams described herein, process methods that can be implemented in accordance with the disclosed subject matter will be better appreciated with reference to the flowcharts of FIGS. 6-9. While for purposes of simplicity of explanation the methods of FIGS. 6-9 are shown and described as a series of blocks, it is to be understood and appreciated that the scope of the disclosure and the claimed subject matter is not limited by the order of the blocks, as some blocks can occur in different orders or concurrently with other blocks from what is depicted and described herein. Moreover, not all illustrated blocks are necessarily required to implement the methods described herein. Additionally, it should be further appreciated that some or all of the methods disclosed throughout this specification are capable of being stored on an article of manufacture to facilitate transporting and transferring such methods to an electronic device. The term article of manufacture, where utilized, is intended to encompass a computer program accessible from any computer-readable device, device in conjunction with a carrier, or storage medium.

Figure 6:
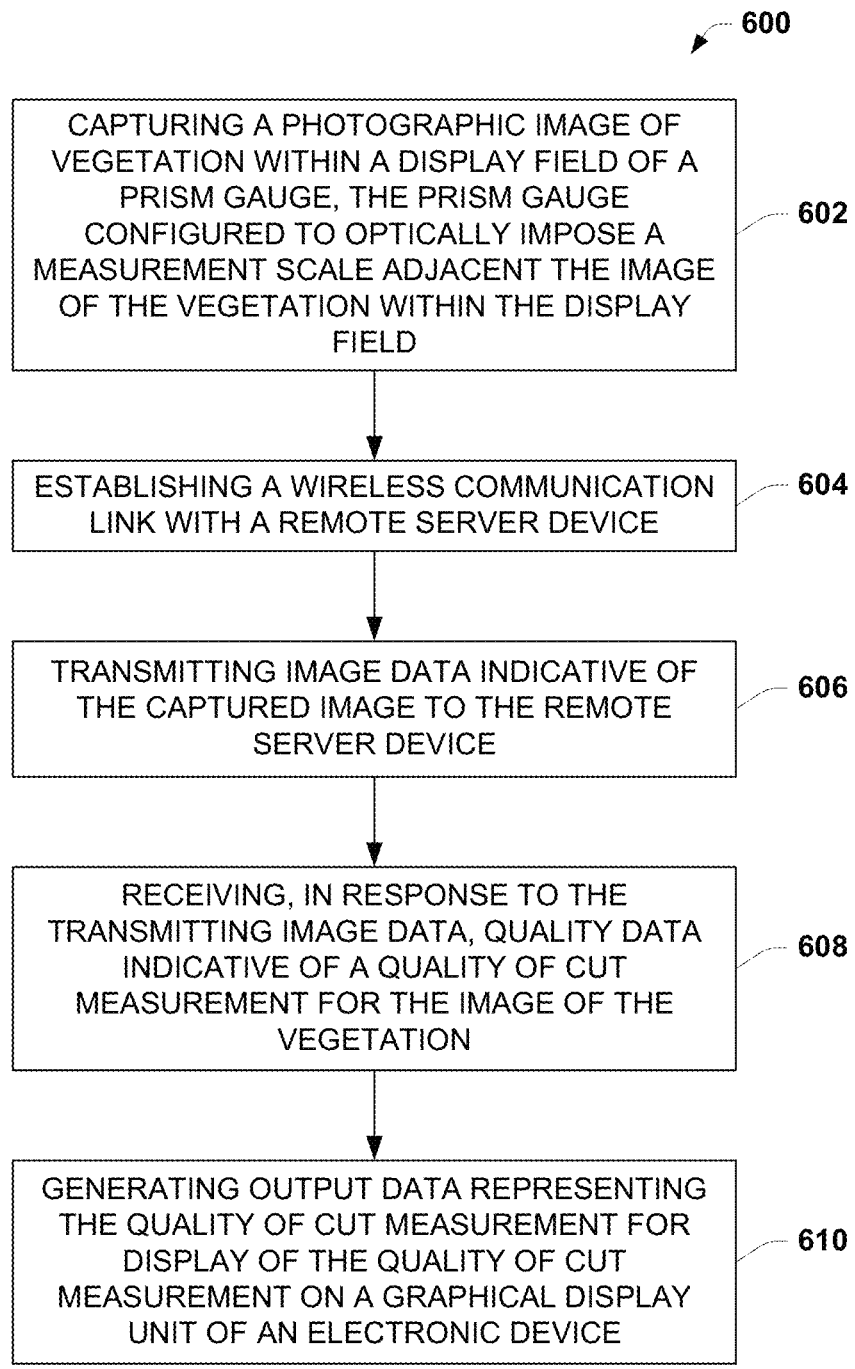
FIG. 6 depicts a flowchart of a sample method for generating quality-of-cut analysis for power equipment from objective results data, in an embodiment.

Referring now to FIG. 6, there is depicted a flowchart of a sample method 600 according to alternative or additional embodiments of the present disclosure. Method 600 can comprise, at 602, capturing a photographic image of vegetation within a display field of a prism gauge. In an embodiment, the prism gauge can be configured to optically impose a measurement scale adjacent the image of the vegetation within the display field (e.g., overlying the image of the vegetation, behind the image of the vegetation, or the like). At 604, method 600 can comprise establishing a wireless communication link with a remote server device and, at 606, transmitting image data indicative of the captured image to the remote server device. At 608, method 600 further comprise receiving, in response to the transmitting image data, quality data indicative of a quality of cut measurement for the image of the vegetation. The quality data can provide a measurement, statistical result, or the like of a uniformity-of-cut of the image of the vegetation, or similar. At 610, method 600 can comprise generating output data representing the quality of cut measurement for display of the quality of cut measurement on a graphical display of an electronic device.

In a further embodiment, method 600 can comprise receiving adjustment data, in response to transmitting the image data. The adjustment data can be adapted to identify a mechanical parameter associated with the machine for mowing vegetation and a revised value for the mechanical parameter. In a further embodiment, method 600 can also comprise communicatively coupling to an electronic control unit of the machine for mowing vegetation and updating a data field of the electronic control unit corresponding to the mechanical parameter to the revised value for the mechanical parameter. In yet another embodiment, the electronic device can be a mobile phone removably mounted to the display field of the prism gauge. In such embodiment, the mobile device can comprise a camera module for capturing the image, a wireless communication module for establishing the wireless communication link, transmitting the image data and receiving the quality data, a processor for generating the output data and displaying the output data at the graphical display unit, and a wired communication interface or a second wireless communication interface for communicatively coupling the electronic device to the electronic control unit of the machine for updating the data field to the revised value for the mechanical parameter.

In one or more other embodiments of the present disclosure, method 600 can comprise generating second output data representing the revised value for the mechanical parameter for display of the revised value on the graphical display unit of the electronic device. In a further embodiment, method 600 can comprise acquiring at least one of: machine setup data indicative of a frequency of clip, rear roller position or bedknife position of the machine, or characteristic data of the vegetation or of the machine as an input to the electronic device. In such embodiment, method 600 can then comprise submitting the machine setup data or characteristic data to the remote server device in conjunction with the image data, wherein the adjustment data is determined from the quality of cut measurement and the machine setup data or characteristic data. As a particular example, the characteristic data can include vegetation type data, height of cut data, moisture content data or a combination of the foregoing. As another particular example, the adjustment data can include an adjustment to the frequency of clip of the machine or to a cassette reel speed of the machine.

Figure 7:
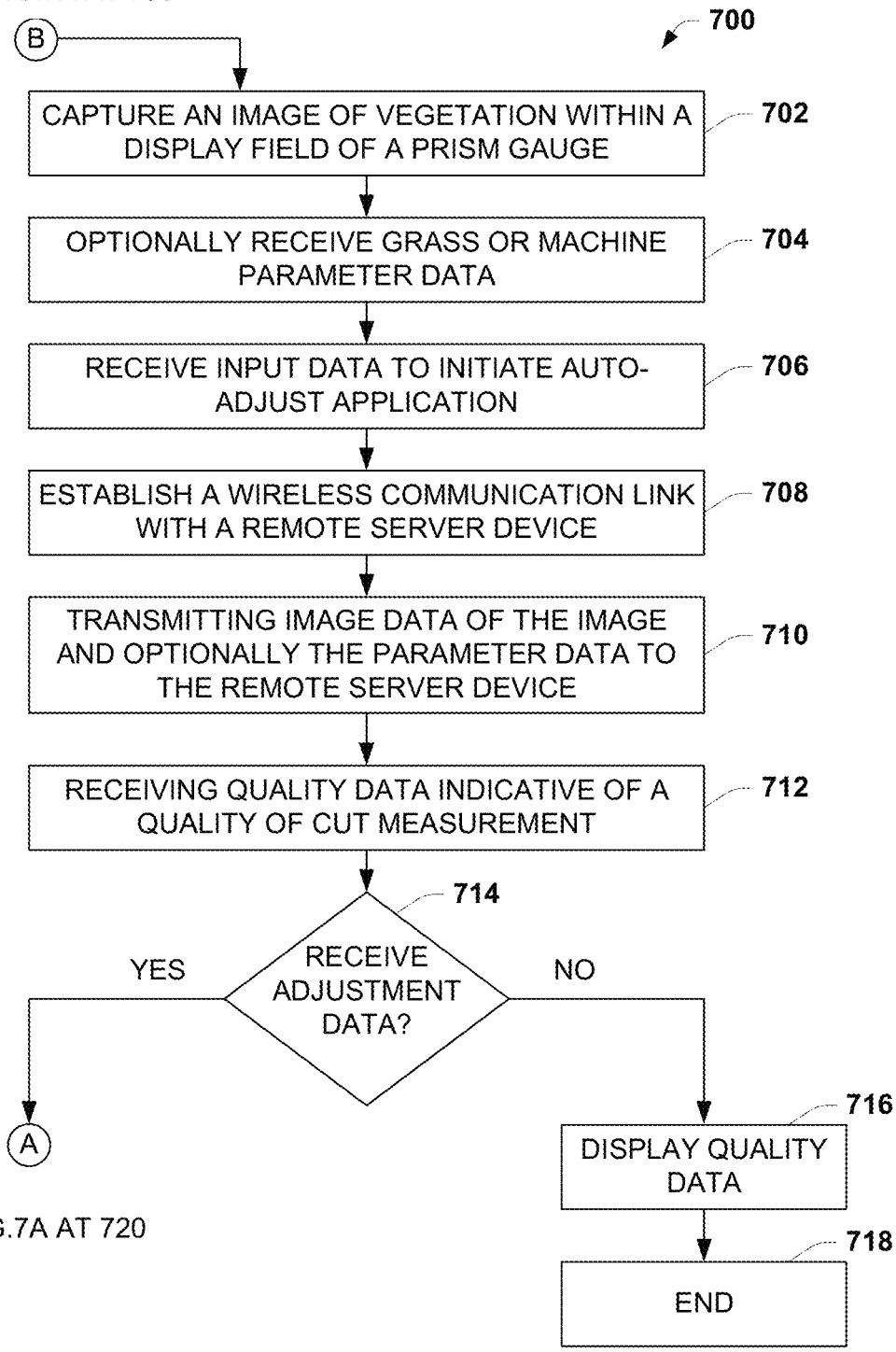
FIGS. 7 and 8 illustrate a flowchart of an example method for calibrating a power equipment utilizing objective quality-of-cut analysis, in further embodiments.
Figure 8:
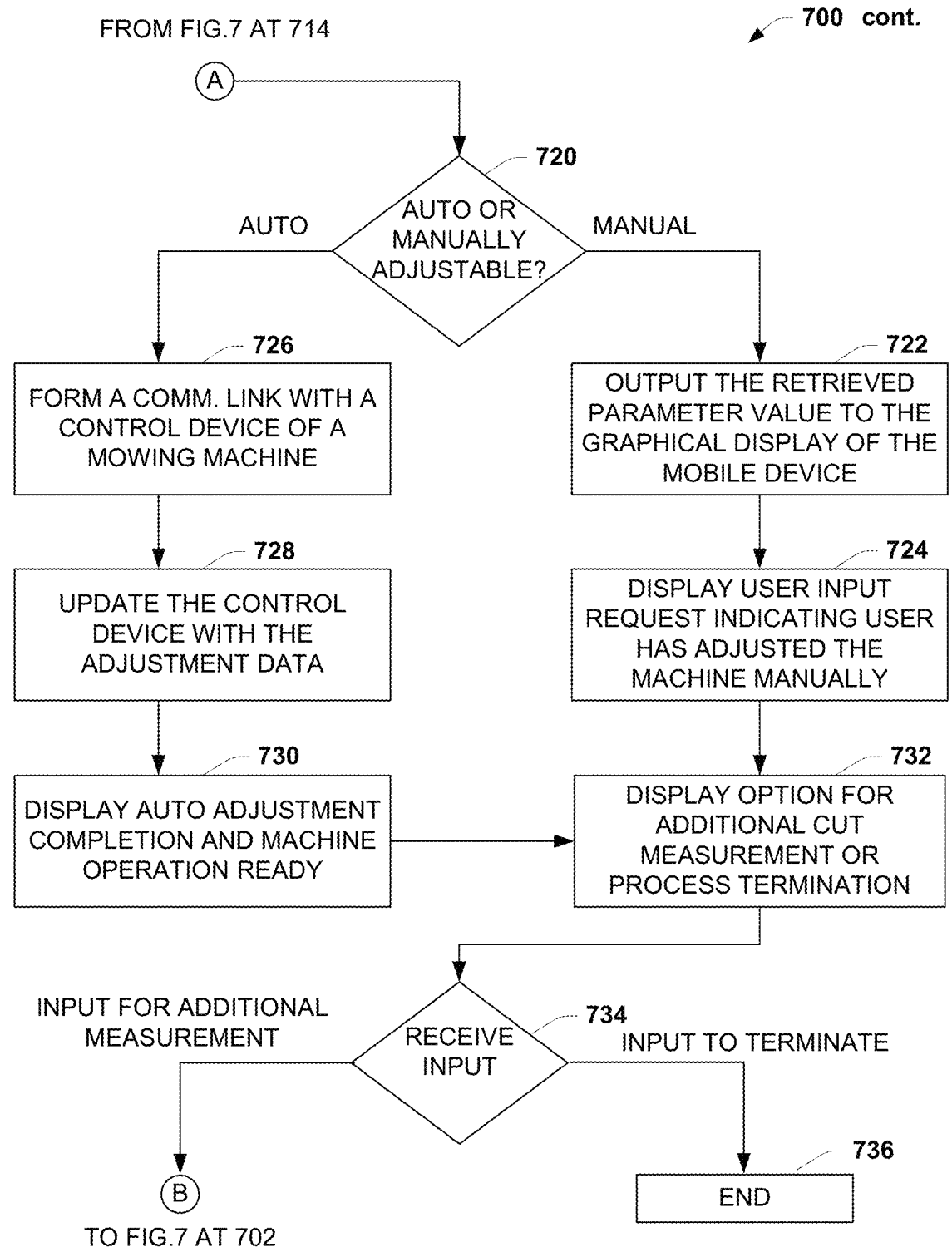

Referring now to FIGS. 7 and 8, a flowchart of a sample method 700 according to still other disclosed embodiments is provided. At 702, method 700 can comprise capturing an image of vegetation within a display field of a prism gauge. At 704, method 700 can comprise optionally receiving grass type, moisture content or machine parameter data pertaining to the vegetation or to a machine adapted for cutting the vegetation. At 706, method 700 can comprise receiving input data to initiate an auto-adjustment application for automatically calibrating the machine.

At 708, method 700 can comprise establishing a wireless communication link with a remote server device. At 710, method 700 can also comprise transmitting image data of the image and optionally the grass type, moisture content or machine parameter data to the remote server device. In response, and at 712, method 700 can comprise receiving quality of cut data indicative of a quality of cut measurement or analysis of the image of vegetation. At 714 a decision is made as to whether or not adjustment data is received with the quality data. If not, method 700 can proceed to 716 where the quality of cut measurement or analysis is displayed on a graphical display, and method 700 ends at 718. Otherwise, method 700 can proceed to 720 at FIG. 8.

Referring now to FIG. 8, at 720, method 700 can comprise determining whether the received the adjustment data pertains to an auto adjustable or manually adjustable mechanical parameter. If auto adjustable, method 700 proceeds to 726. Otherwise, if manually adjustable, method 700 can proceed to 722.

At 722, method 700 can comprise outputting the retrieved parameter value to the graphical display of the mobile device. At 724, method 700 can comprise displaying user input request data, requesting the user to provide a user input interface response indicating the user has adjusted the machine manually. Method 700 can then proceed to reference number 732.

At 726, method 700 can comprise forming a communication link with a control device of the mowing machine (if not already established, e.g., in conjunction with acquiring machine parameter data at reference number 704). At 728, method 700 can comprise updating the control device with the adjustment data. As one example, the updating the control device can comprise saving the adjustment data to a data field associated with the auto adjustable mechanical parameter. At 730, method 700 can comprise displaying auto adjustment completion and machine operation readiness at the graphical display. At 732, method 700 can comprise displaying an option for additional cut measurement or termination of method 700. In response to receiving input at 734, a determination is made as to whether the input indicates an additional measurement, or process termination. If process termination, method 700 can end at 736. Otherwise, method 700 can return to 702 at FIG. 7 and proceed from there.

Figure 9:
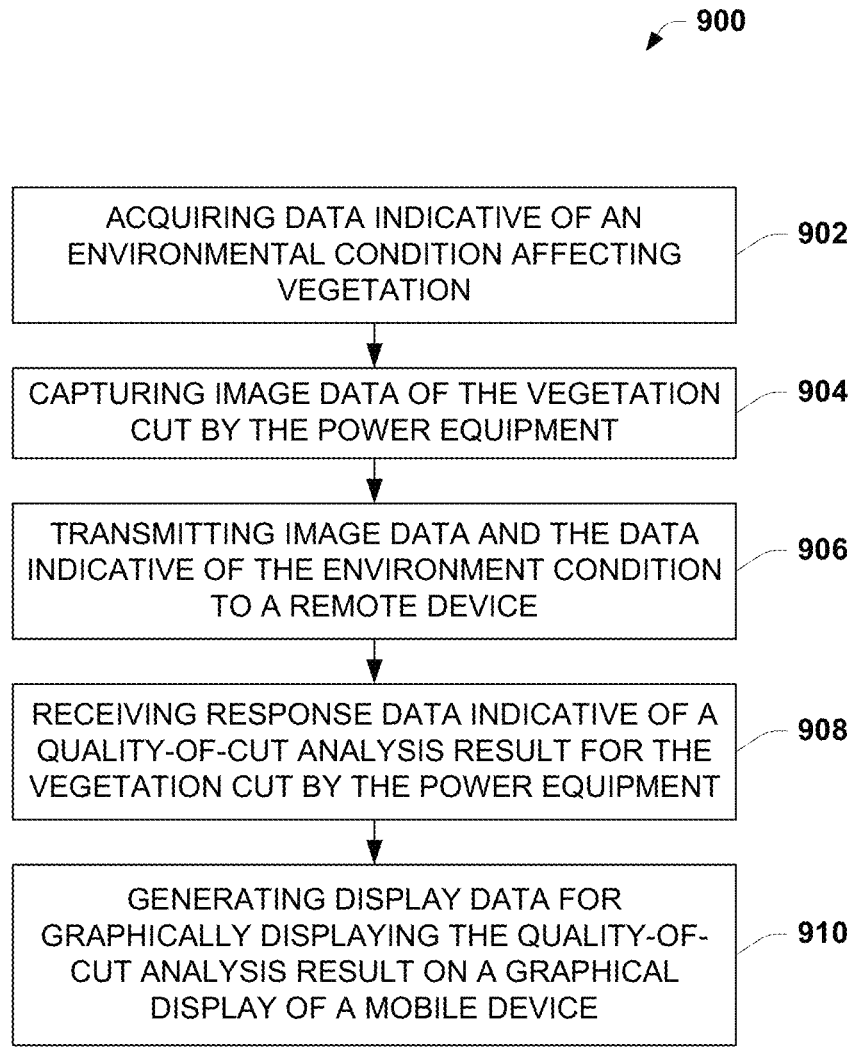
FIG. 9 depicts a flowchart of an example method for generating quality-of-cut analysis with comparative results of historic quality-of-cut data, in further embodiments.

Referring now to FIG. 9, there is depicting a method for facilitating implementation of embodiments of the present disclosure. At 902, method 900 can comprise acquiring data indicative of an environmental condition affecting vegetation. The data can be acquired from a database, in an embodiment, or from a data server in another embodiment. In other embodiments, the data can be acquired from a sensor configured to capture the data. Suitable sensors can include fixed or mobile sensors, as described herein or known in the art.

At 904 method 900 can comprise capturing image data of the vegetation cut by the power equipment, and at 906 transmitting the image data and the data indicative of the environment condition to a remote device. The remote device can be a server device in an embodiment(s), configured to analyze the image data for performance metrics associated with quality of cut of vegetation. Further, the remote device can store the image data, and the analyzed performance metrics with the environment condition.

At 908, method 900 can comprise receiving response data indicative of a quality-of-cut analysis result for the vegetation cut by the power equipment. At 910, method 900 can comprise generating display data for graphically displaying the quality-of-cut analysis result on a graphical display of a mobile device.

In one or more embodiments, method 900 can further comprise receiving, in conjunction with the response data, adjustment data for modifying a mechanical parameter of the power equipment and adjusting the mechanical parameter of the power equipment consistent with the adjustment data. In additional embodiments, method 900 can comprise capturing additional image data of additional vegetation cut by the power equipment in response to adjusting the mechanical parameter of the power equipment and transmitting the additional image data to the remote device. In yet other embodiments, method 900 can comprise receiving further response data indicative of a further quality-of-cut analysis result for the additional vegetation but by the power equipment in response to adjusting the mechanical parameter of the power equipment.

In additional embodiments, method 900 can comprise receiving the response data in conjunction with historical data, the historical data including multiple prior quality-of-cut analysis results pertaining to the vegetation, or pertaining to the power equipment. In an embodiment method 900 can further comprise generating comparative data indicative of a contrast between the quality-of-cut analysis result and the multiple prior quality-of-cut analysis results. In an alternative or additional embodiment, method 900 can comprise communicatively coupling to a control device of the power equipment and obtaining current settings data for adjustable mechanical parameters of the power equipment, and transmitting the current settings data in conjunction with the image data and the data indicative of the environmental condition to the remote device. In still further embodiments, method 900 can comprise receiving the response data further comprises receiving adjustment data for adjustment of one of the adjustable mechanical parameters of the power equipment or an additional mechanical parameter of the power equipment, the adjustment data configured to improve the quality-of-cut analysis result for the vegetation, the environment condition and for the current settings data of the power equipment.

What has been described above includes examples of the subject innovation. It is, of course, not possible to described every conceivable combination of devices, components thereof or method steps for purposes of describing the subject disclosure, but one of ordinary skill in the art can recognize that many further combinations, additions, subtractions and permutations are possible. Accordingly, the disclosed subject matter is intended to embrace all such alterations, modifications and variations that fall within the spirt and scope of the disclosure. To the extent that the term "includes", "including", "has" or "having" and variants thereof is used in either the detailed description or the claims, such term is intended to be inclusive in a manner similar to the term "comprising" as "comprising" is interpreted when employed as a transitional word in a claim.

The word "exemplary" where used herein is intended to mean serving as an example, instance or illustration. Any aspect or design described herein as "exemplary" is not necessarily to be construed as preferred or advantageous over other aspects or designs. Rather, use of the word "exemplary" is intended to present concepts in a concrete fashion. As used in this application, the term "or" is intended to mean an inclusive "or" rather than an exclusive "or". Accordingly, unless specified otherwise or clear from context, "X employs A or B" is intended to mean any of the natural inclusive permutations of A or B. That is, if X employs A, X employs B; or X employs both A and B, then "X employs A or B" is satisfied. In addition, the articles "a" and "an" as used in this application and the appended claims should generally be construed to mean "one or more" unless specified otherwise or clear from context to be directed to a singular form.

What is claimed is:

1. A method of calibrating a machine for mowing vegetation, comprising:
  capturing an image of vegetation within a display field of a prism gauge, the prism gauge configured to optically impose a measurement scale adjacent the image of the vegetation within the display field;
  establishing a wireless communication link with a remote server device;
  transmitting image data indicative of the captured image to the remote server device;
  receiving, in response to the transmitting image data, quality data indicative of a quality of cut measurement for the image of the vegetation; and
  generating output data representing the quality of cut measurement for display of the quality of cut measurement on a graphical display unit of an electronic device.

2. The method of claim 1, further comprising receiving adjustment data, in response to transmitting the image data, the adjustment data identifying a mechanical parameter associated with the machine for mowing vegetation and a revised value for the mechanical parameter.

3. The method of claim 2, further comprising communicatively coupling to an electronic control unit of the machine for mowing vegetation and updating a data field of the electronic control unit corresponding to the mechanical parameter to the revised value for the mechanical parameter.

4. The method of claim 3, wherein the electronic device is a mobile phone, the mobile phone removably mounted to the display field of the prism gauge and comprising:

a camera module for capturing the image;
a wireless communication module for establishing the wireless communication link, transmitting the image data and receiving the quality data;
a processor for generating the output data and displaying the output data at the graphical display unit; and
a wired communication interface or a second wireless communication interface for communicatively coupling the electronic device to the electronic control unit of the machine for updating the data field to the revised value for the mechanical parameter.

5. The method of claim 2, further comprising generating second output data representing the revised value for the mechanical parameter for display of the revised value on the graphical display unit of the electronic device.

6. The method of claim 2, further comprising:
acquiring at least one of: machine setup data indicative of a frequency of clip, rear roller position or bedknife position of the machine, or characteristic data of the vegetation or of the machine as an input to the electronic device; and
submitting the machine setup data or characteristic data to the remote server device in conjunction with the image data, wherein the adjustment data is determined from the quality of cut measurement and the machine setup data or characteristic data.

7. The method of claim 6, wherein:
the characteristic data includes vegetation type data, height of cut data, moisture content data or a combination of the foregoing; and
the adjustment data including an adjustment to the frequency of clip of the machine or to a cassette reel speed of the machine.

8. A mobile device adapted to facilitate quality analysis of a power equipment, comprising:
a processor for executing instructions to perform operations of the mobile device; and
a memory for maintaining the instructions executed by the processor, the operations comprising:
acquiring, by way of a camera module of the mobile device, image data of vegetation, the vegetation having been trimmed by the power equipment;
at least one of: acquiring, by the processor, settings data pertaining to a current setting of a mechanical parameter of the power equipment or acquiring, by the processor, environment data pertaining to the vegetation or a climate affecting the vegetation;
forming, utilizing a wireless communication interface of the mobile device, a communication link with a server device remotely located from the mobile device;
transmitting, utilizing the wireless communication interface, the image data and the settings data or the environment data to the server device;
receiving, utilizing the wireless communication interface, a quality-of-cut determination defining a height-of-cut or a uniformity of cut for the image data of the vegetation in response to transmitting the image data and the settings data or the environment data; and
outputting, at a graphical display of the mobile device, data indicative of the quality-of-cut determination.

9. The mobile device of claim 8, wherein the operations further comprise receiving adjustment data for modifying the current setting of the mechanical parameter, or for setting a second mechanical parameter of the power equipment.

10. The mobile device of claim 9, further comprising a second communication interface, wherein the operations further comprise:
forming a second communication link with a control device of the outdoor power equipment; and
transmitting to the control device the adjustment data, facilitating automated adjustment of the mechanical parameter or the second mechanical parameter consistent with the adjustment data.

11. The mobile device of claim 9, further comprising outputting the adjustment data at the graphical display of the mobile device and outputting an instruction to manually adjust the mechanical parameter or the second mechanical parameter consistent with the adjustment data.

12. The mobile device of claim 8, wherein the operations further comprise receiving stored quality-of-cut data in conjunction with the quality-of-cut determination for comparison of the quality-of-cut determination with the stored quality-of-cut data.

13. The mobile device of claim 12, wherein the stored quality-of-cut data delineates quality-of-cut determinations as a function of a parameter selected from a group consisting of: time, environmental condition, type of vegetation, season of the year, time of day, and a suitable combination of the foregoing.

14. The mobile device of claim 8, further comprising a second communication interface configured to communicatively couple the mobile device to a measurement device configured to generate the environment data pertaining to the vegetation or a climate affecting the vegetation, wherein the mobile device acquires the environment data from the measurement device by way of the second communication interface.

15. A method of generating a quality-of-cut determination for a power equipment, comprising:
acquiring data indicative of an environmental condition affecting vegetation;
capturing image data of the vegetation cut by the power equipment;
transmitting the image data and the data indicative of the environment condition to a remote device;
receiving response data indicative of a quality-of-cut analysis result, representing a height of cut metric or a uniformity of cut metric, for the vegetation cut by the power equipment; and
generating display data for graphically displaying the quality-of-cut analysis result on a graphical display of a mobile device.

16. The method of claim 15, further comprising:
receiving, in conjunction with the response data, adjustment data for modifying a mechanical parameter of the power equipment;
adjusting the mechanical parameter of the power equipment consistent with the adjustment data;
capturing additional image data of additional vegetation cut by the power equipment in response to adjusting the mechanical parameter of the power equipment;
transmitting the additional image data to the remote device; and
receiving further response data indicative of a further quality-of-cut analysis result for the additional vegetation but by the power equipment in response to adjusting the mechanical parameter of the power equipment.

17. The method of claim 15, further comprising receiving the response data in conjunction with historical data, the historical data including multiple prior quality-of-cut analysis results pertaining to the vegetation, or pertaining to the power equipment.

18. The method of claim 17, further comprising generating comparative data indicative of a contrast between the quality-of-cut analysis result and the multiple prior quality-of-cut analysis results.

19. The method of claim 15, further comprising communicatively coupling to a control device of the power equipment and obtaining current settings data for adjustable mechanical parameters of the power equipment, and transmitting the current settings data in conjunction with the image data and the data indicative of the environmental condition to the remote device.

20. The method of claim 19, wherein receiving the response data further comprises receiving adjustment data for adjustment of one of the adjustable mechanical parameters of the power equipment or an additional mechanical parameter of the power equipment, the adjustment data configured to improve the quality-of-cut analysis result for the vegetation, the environment condition and for the current settings data of the power equipment.

* * * * *